June 10, 1947.  F. B. DOANE  2,421,775
METHOD AND APPARATUS FOR MAGNETIC TESTING
Filed June 28, 1943   3 Sheets-Sheet 1
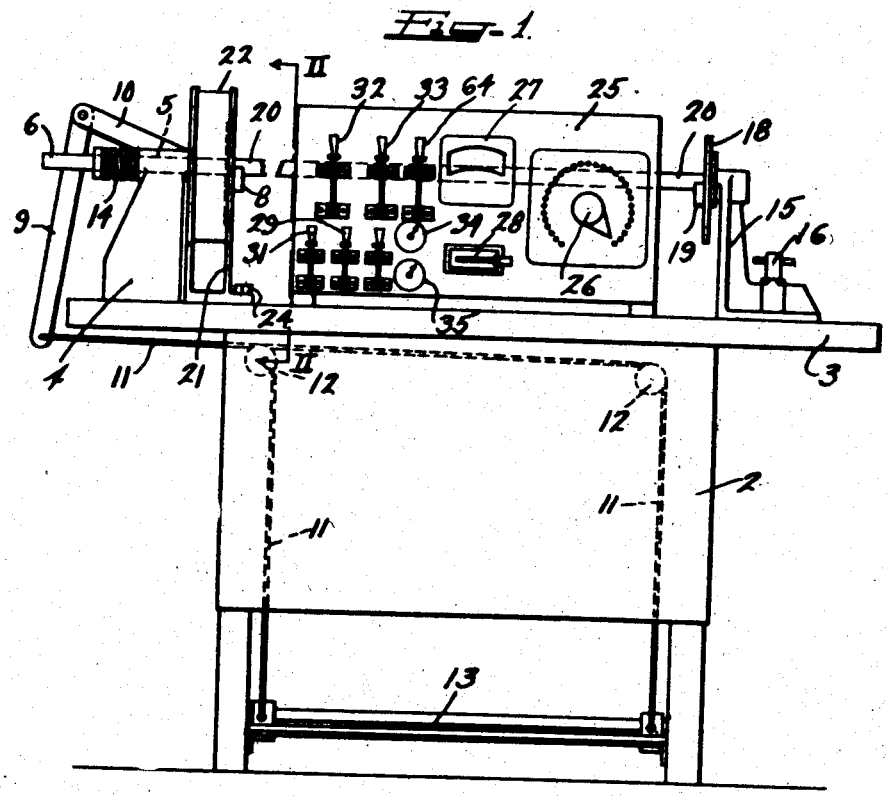
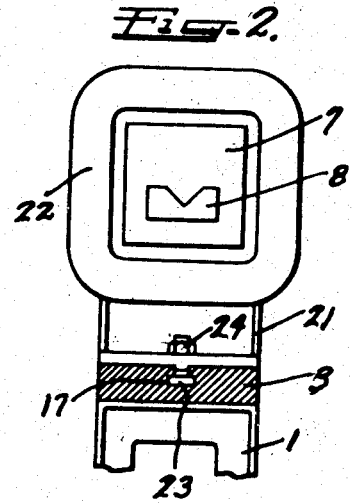
Inventor
FOSTER B. DOANE.

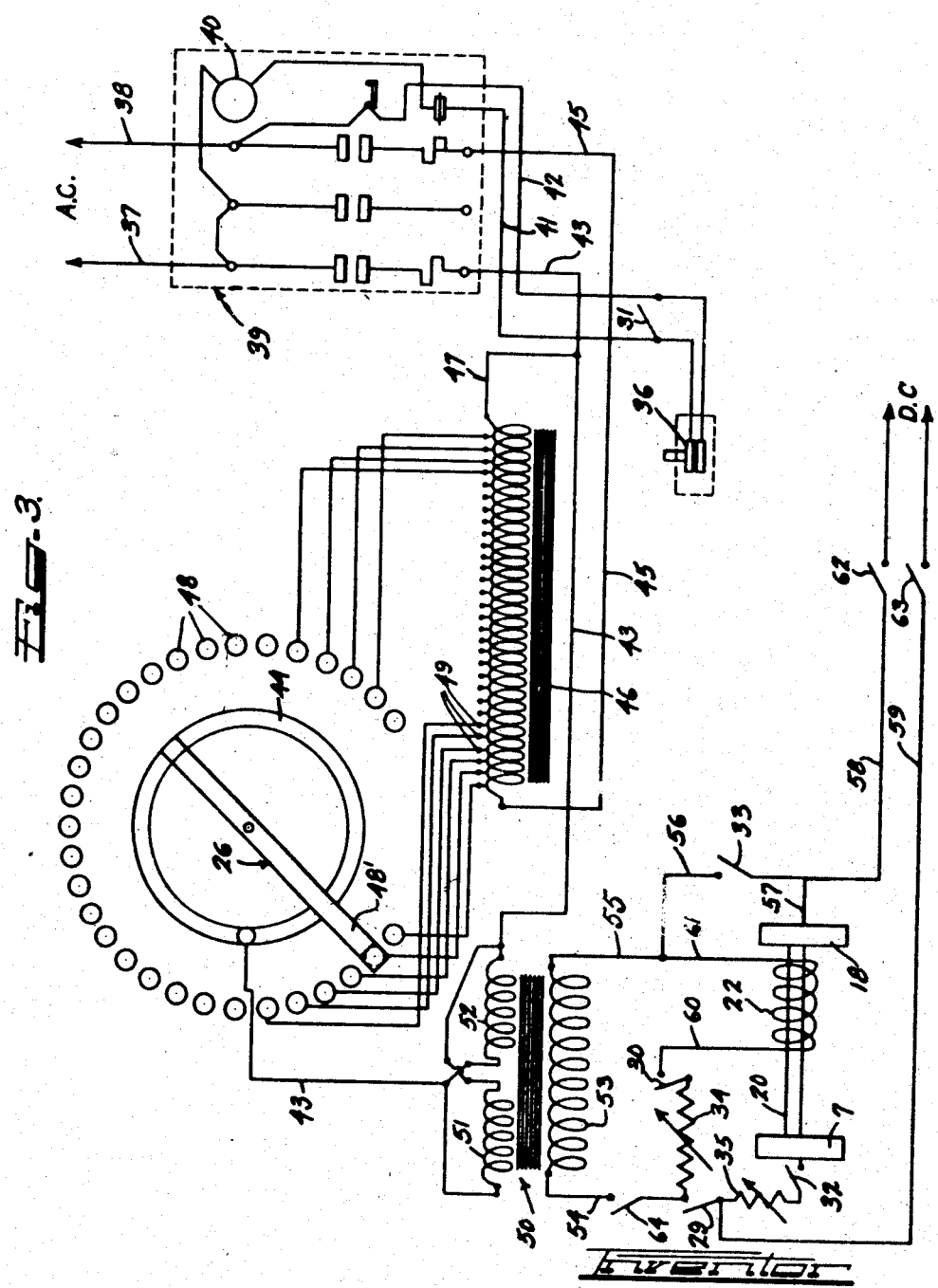

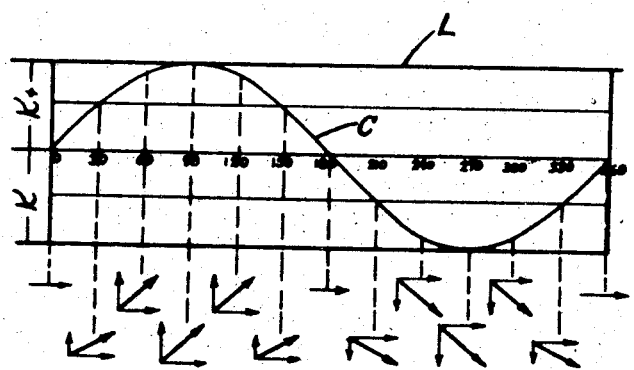
Fig-4.
   
Fig-5.  Fig-6.  Fig-7.  Fig-8.
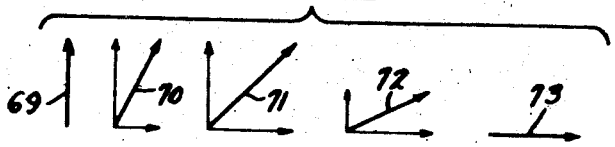
Fig-9.

Patented June 10, 1947

2,421,775

UNITED STATES PATENT OFFICE 2,421,775

METHOD AND APPARATUS FOR MAGNETIC TESTING

Foster B. Doane, Wilmette, Ill., assignor to Magnaflux Corporation, Chicago, Ill., a corporation of Delaware Application June 28, 1943, Serial No. 492,557

4 Claims. (Cl. 175—183)

This invention relates to improvements in a method of and apparatus for magnetically testing magnetizable metallic objects to ascertain the location, nature and extent of faults in the metal, such as highly localized stresses, discontinuities and other defects, although the invention may have other uses and purposes, as will be apparent to one skilled in the art.

I am aware that in the past many and various types of equipment for magnetically inspecting or testing metallic articles have been developed as well as various methods of magnetic inspection. Some of these formerly known arrangements pass electric current directly through the test piece to establish circular magnetization within the piece, while others utilize a coil for longitudinally magnetizing the test piece. Certain arrangements were also provided for demagnetizing the test piece after it had been inspected.

However, it is desirable to provide a method of and apparatus for magnetic testing which is more flexible and which is capable of greater flexibility in the testing of a metallic item, so that it is not necessary to move the item from one location to another, rearrange it, and adjust it to accommodate the various magnetizing forces and the demagnetizing operation.

This application is a continuation in part of my copending application for patent Serial No. 274,877, entitled "Method and apparatus for magnetic testing," filed May 22, 1939, now Patent No. 2,401,467, and assigned to the same assignee as the present invention.

It is an object of the present invention to provide a method of and apparatus for inducing both circular and longitudinal magnetization in a test piece, in successive order, without moving the test piece.

Another object of the present invention is to provide a novel method and apparatus for inducing circular and longitudinal magnetization in a test piece, in successive order or simultaneously.

A further object of the present invention is to provide a novel method and means for inducing circular magnetization and longitudinal magnetization in a test piece, one form of magnetization being effected by alternating current, while the second form of magnetization is effected by direct current.

A further object of the present invention is to provide a novel method and means for inducing circular and longitudinal magnetizaton in a test piece, the magnetization being effected through varying direct current energization circuits.

Another and further object of the present invention is to provide a novel method and means for inducing a vector or bi-polar magnetization field of controlled intensity and direction in a test piece to be examined for abrupt changes in permeability.

Another and still further object of the present invention is to provide a novel method and means for inducing a variable vector magnetization field of controlled intensity and direction in a test piece, wherein the vector field may be varied over a wide angular range as to direction as well as to intensity.

Still another and further object of the present invention is to provide a novel method and means for producing an oscillating magnetic field in a test piece.

The novel features which I believe to be characteristic of my invention are set forth with particularity in the appended claims. My invention itself, both as to its manner of construction and method of operation, together with further objects and advantages thereof, may best be understood by reference to the following description, taken in connection with the accompanying drawings, in which:

Figure 1 is a view in elevation, with some parts shown diagrammatically, of a magnetic testing device embodying principles of the present invention;

Figure 2 is a fragmentary vertical sectional view with parts omitted, taken substantially as indicated by the line II—II of Figure 1, looking in the direction of the arrows;

Figure 3 is a fragmentary wiring diagram of the electrical circuits embodied in the structures of Figures 1 and 2, with the usual meter connections eliminated;

Figure 4 is a diagram showing magnetizing current curves with vector diagrams indicating variations in strength and intensity of the resultant magnetic fields;

Figure 5 indicates the angle of oscillation of the resultant magnetic field of Figure 8 when direct current is used to longitudinally magnetize the test piece, and alternating current is used to circularly magnetize the test piece;

Figure 6 indicates the angle of oscillation of the resultant magnetic field with the direct current reversed in direction;

Figure 7 indicates the angle of oscillation of the resultant magnetic field when alternating current is used to longitudinally magnetize the test piece and direct current is used to circularly magnetize the test piece;

Figure 8 indicates the angle of oscillation of the magnetic field with the direct current reversed in direction; and Figure 9 is a series of vector diagrams indicating the directions of the resultant magnetic field at various relations of circular to longitudinal magnetizing forces.

Referring now to Figures 1 and 2 of the drawings, it will be seen that the embodiment of the invention therein illustrated embodies a frame 1, sheathed for protection to the operator, as indicated at 2, and upon which a bed plate 3 is disposed. Near one end of the bed plate is a fixed head 4 having a portion 5 formed as a journal for a sliding or reciprocable rod 6. On the inner end thereof, the rod 6 carries an electrically conductive face plate 7 to which is secured a V-support 8 or one end of the test piece. The rod is reciprocated by means of a lever 9 extending through a slot near the outer end of the arm and having one end pivoted to a fixed arm 10. The other end of the lever is connected to a double cable 11—11 extending over a pair of spaced pulleys 12—12 inside the sheathing 2 and connected to a suitable foot pedal 13.

Applying pressure upon the foot pedal 13 causes the lever 9 to move the rod 6 and conductive plate 7 inwardly to insure tight contact with the test piece resting upon the V-support 8. Any suitable form of latching mechanism may be used in connection with the foot pedal to hold the rod 6 in the desired degree of inward adjustment. Upon release of the latching mechanism, if the same is utilized, a coil spring 14 suitably disposed between a collar carried by the rod and the head 4 urges the rod outwardly to initial position.

The bed plate 3 is also provided with a movable head 15 which may be anchored in any desired position along the bed by means of a threaded anchoring element 16. The movable head 15 is, of course, provided with a bolt head rider for an inverted T-groove 17 in the bed 3. This movable head also carries a conductive plate 18, upon which is another V-support 19 similar to the V-support 8 on the fixed head. Between the two supports 8 and 19, a test piece, indicated at 20 in Figure 1, may be disposed and held in proper position for magnetic inspection. It is simply necessary to adjust the movable head 15 to approximately the correct location, place the test piece in position, and step upon the foot pedal 13 to insure a tight contact between the contact plates 7 and 18 and the test piece.

Also slidable along the bed 3 is a frame 21 carrying a coil 22 of sufficient size to freely pass over the conductive plate 7, and likewise any test piece held between the conductive plates 7 and 18. This frame 21 carries a bolt head rider 23 disposed in the groove 17 in the bed and may be anchored in any desired position along the bed by means of a nut 24 or the equivalent. When the coil is used to magnetize the test piece it may be slid along to various locations along the test piece, and when not in use, it is moved back to the position shown in Figure 1 adjacent the fixed head 4, leaving exposed beyond the coil the conductive plate 7 so that entire freedom is had for a full inspection of the test piece by virtue of the circular magnetization due to the passage of current from the conductive plate 7 to the conductive plate 18 directly through the test piece.

Also carried by the frame 1 behind the bed 3 is a switchboard or control panel 25. This panel carries a dial switch 26 for controlling current intensity both through the coil 22 and through the test piece between the face plates 7 and 18 when current is supplied under conditions presently to be described. Also mounted on the panel is a meter 27 with a meter switch 28, the connections for which are not shown in the wiring diagram of Figure 3, six switches 29, 30, 31, 32, 33 and 64, and a pair of variable resistor controls 34 and 35.

When the test piece is mounted as above described, energization may be established by hand through the main switch 31 or through a foot pedal switch 36 as indicated in Figure 3, which is responsive to pressure upon the pedal 13. After the main circuit is closed in either way, closure of the switch 29 with the switch 30 remaining open, effects circular magnetization of the test piece by passing current straight through the test piece from the face plate 7 to the face plate 18. Likewise, with the switch 29 open and the switch 30 closed, longitudinal magnetization of the test piece is effected by way of he coil 22 which may be moved along the test piece as above described. Simultaneous closure of both switches 29 and 30 results in energization of both the coil 22 and the passage of current directly through the test piece between the face plates, thus setting up a bi-polar magnetic field in the test piece which is the resultant of the circular and longitudinal fields.

In Figure 3, I have illustrated the wiring diagram of the electrical circuit utilized in the apparatus of Figures 1 and 2. It will be seen that conductors 37 and 38 may be connected to any suitable source of alternating current electrical energy. The conductors 37 and 38 are connected to a switch or circuit breaker generally indicated by the numeral 39. The operating coil 40 of this breaker is energized by means of either the foot pedal switch 36 or the hand operated switch 31 through conductors 41 and 42.

One side of the breaker is connected through a conductor 43 to the contact ring 44 of the dial switch 26. The other side of the breaker is connected through a conductor 45 to one end of the coil of an autotransformer 46, the other end of the coil being connected to the conductor 43 by way of a wire 47. The dial switch embodies a number of contact points 48 which may be successively contacted by the rotating arm 48' of the switch, and each contact point or button is connected by a separate lead to a different point on the auto transformer coil, as indicated at 49. Of course, the contact buttons 48 are successively connected to points on the auto transformer coil so that, as shown in this figure, the lower left-hand button provides maximum current while the lower right-hand button provides minimum current.

Magnetizing current is supplied by way of a transformer 50 embodying a pair of primary coils 51 and 52 connected in parallel and interposed in the aforesaid conductor 43. One end of the secondary coil 53 of this transformer is connected through a conductor 54 and variable resistor 35 to the face plate 7 on the fixed head 4 of the machine. The other end of the secondary coil 53 is connected through a conductor 55, conductor 56, switch 33 and conductor 57 to face plate 18. The switches 29 and 33 are arranged to interrupt flow of current to face plates 7 and 18. The magnetizing coil 22 is connected through conductor 60, switch 30, variable resistor 34, and conductor 54 to one side of secondary 53 and through conductor 61 to the other side thereof. A switch 64 is interposed in conductor 54 for a reason which will presently be apparent.

The magnetizing coil 22 and the test piece 20 are also arranged to be connected to a source of direct current electrical energy through supply conductors 58 and 59, there being a pair of switches 62 and 63 interposed therein. Conductor 58 is connected to face plate 18 through conductor 57 and it is connected to one end of the magnetizing coil 22 through switch 33 and conductors 56 and 61. The other direct current supply conductor 59 is connected to the face plate 7 through variable resistor 35 and switch 32, and it is connected to the magnetizing coil 22 through switch 29, variable resistor 34, switch 30 and conductor 60.

From the above description it will be apparent that alternating current may be supplied to magnetizing coil 22 and to the test piece 20, or direct current may be supplied to both the magnetizing coil 22 and the test piece 20, or, alternating current may be supplied to the magnetizing coil 22 and direct current supplied to the test piece 20. Although it is not shown, it will be readily apparent that if desired the direct and alternating current supplied may be arranged in such a manner that direct current is supplied to the magnetizing coil 22 and alternating current supplied to the test piece 20. It will further be appreciated that while the variable resistors 34 and 35 are shown independent of each other, these resistors may, if desired, be mechanically coupled in such a manner that when the resistance of one is increased the resistance of the other is correspondingly decreased.

To illustrate the universality of this invention, several results may be mentioned by way of example and not by way of limitation. If both magnetizing forces are produced by direct current, the direction of the resultant field may be controlled by increasing the setting of one of the variable resistors 34 and 35 while decreasing the setting of the other. This will cause the direction of the resultant magnetic field to shift back and forth through 90°. In order to energize both the magnetizing coil 22 and the test piece 20 with direct current, the A. C. circuit breaker 39 is left open and switch 64 is open. Switches 29, 30, 33 and 62 and 63 are closed. This causes direct current to flow through variable resistor 35 and the specimen 20 as well as through variable resistor 34 and magnetizing coil 22.

If it is desired to energize both the magnetizing coil 22 and the specimen 20 with alternating current, switches 62 and 63 are open and all of the remaining switches are closed. Then by simultaneously varying the values of the variable resistors 34 and 35 between their positions of maximum resistance and minimum resistance, one resistor being increased while the other is decreased, the direction of the resulting magnetic field will be shifted back and forth. This may or may not be a continuous process, as desired. For example, a reading may first be taken and the test piece examined when maximum resistance is provided by resistor 34 and minimum resistance is provided by resistor 35, and later a subsequent reading may be taken while the specimen 20 is still held between the plates 7 and 18 with the resistor 35 set to provide maximum resistance and resistor 34 set to provide minimum resistance.

When it is desired to produce one magnetizing force by means of direct current and a second magnetizing force by means of alternating current, switches 29 and 33 are open, and all of the remaining switches are closed. This causes alternating current to be supplied to the magnetizing coil 22 while direct current is caused to pass through the specimen 20. Under such circumstances the resultant magnetic field may be caused to sweep back and forth through different selected regions up to 180°. By reversing the connection of the power supply lines 58 and 59 the selected regions may be extended to cover a region of 360°.

It will therefore be seen that a test piece may be set up on the apparatus only once. After setting it up, it may first be magnetized circularly or longitudinally, tested by the application of finely divided particles of paramagnetic material, magnetized the other way, tested, and then magnetized by the simultaneous application of both fields to give a vector or resultant field, and this vector field varied through a considerable angular range, so that it will be practically impossible to fail to find a possible defect in the test piece. Still without changing the position of the test piece, it may be demagnetized at any desired time during the testing with equal facility.

For example, the test piece may be demagnetized by passing current directly through it from one face plate to another, using alternating current, and rotating the dial switch slowly and uniformly in a clockwise direction from maximum to minimum. The test piece may also be demagnetized by setting the dial switches at substantially the same location used for magnetizing or at the next higher notch, establishing continuous alternating current flow through the coil, and passing the coil along the length of the test piece, and again withdrawing it to initial position adjacent the fixed head, as seen in Figure 1. Either method will demagnetize the test piece whether its magnetization is circular, longitudinal, or a resultant of both.

It will therefore be seen that a very thorough and complete, and, in fact, a substantially universal magnetic inspection of a test piece may be made with the above described apparatus with only one mounting of the test piece.

It will also be seen that in demagnetizing the test piece, switches 39, 64, 29, 32 and 33 are closed and switches 30, 62 and 63 are opened, and the dial switch is slowly and uniformly moved from its lower left-hand position to its lower right-hand position, thereby gradually reducing the alternating current through the test piece to zero. This causes demagnetization of the test piece.

I have also found that a complete test for cracks and defects irrespective of their orientation with respect to the longitudinal axis of the specimen may be carried on in a single operation by rapidly and alternately opening and closing switches 30 and 32 and sprinkling paramagnetic particles over the specimen while supplying either alternating or direct current to magnetizing coil 22 and specimen 20. This rapid opening and closing of the switches 30 and 32 may be accomplished in any suitable manner either manually or by some suitable power driven commutator switch (not shown), it being only necessary that first one switch and then the other switch be closed and opened in rapid succession.

In Figures 4 to 9 inclusive, various curves and vector diagrams are illustrated to depict in general the strength and direction of the resultant magnetic field during various cycle increments of the respective magnetizing forces, these diagrams being by way of example only to better illustrate the universality of the invention. The curves are arrived at by plotting the magnetizing forces against cycle intervals; the vector diagrams indicate the direction of the resultant magnetic field and, roughly, the strength of the field at various increments of the current cycles.

In Figure 4 direct current is used to produce circular magnetization of the test piece, this current being indicated on the curve by the line L. Alternating current is used to magnetize the test piece longitudinally, in this instance the alternating current being sinusoidal and having a peak value equal to the direct current, as indicated by the line C. The vector diagrams beneath the graph indicate the direction and relative strength of the resultant magnetic field at each 30 degree interval in the cycle of the alternating current. Of course, at the instant when the alternating current is of zero value the resultant magnetic field will be determined by the direct current only and thus appear circularly of the test piece as indicated by the vector arrows opposite zero, 180 and 360 on the chart.

It will be noted that between these values, the resultant magnetic field will oscillate in direction and variant strength in accordance with the wave of the alternating current. Thus, it will be seen that the resultant magnetic field reaches its upper or positive maximum at 90°, and a lower or negative maximum at 270°. In this particular instance the resultant magnetic field oscillates in direction through the 90° angle 65 shown in Figure 5, one boundary of the angle being 45° in the first quadrant, and the other boundary of the angle being at 315° in the fourth quadrant.

The oscillating resultant field may be changed in location. For example, by reversing the direction of the direct current effecting circular magnetization of the test piece, the angle of oscillation will be the 90° angle 66 shown in Figure 6, which angle lies in the second and third quadrant exactly opposite to the showing in Figure 5. Likewise, if direct current is used as the longitudinal magnetizing force and alternating current as the circular magnetizing force, the angle of oscillation of the resultant field will appear in the first and second quadrants indicated at 67 in Figure 7. Again, if the direction of the direct current is reversed, the angle of oscillation will appear in the third and fourth quadrant, as indicated at 68 in Figure 8.

It is apparent, therefore, that using one magnetizing force of direct current and another magnetizing force of alternating current will give an oscillating resultant magnetic field, and the general direction or region of oscillation of this resultant field may be predetermined and pre-selected by the simple expedient of selecting the direction of the direct current and choosing between the two currents for the component magnetizing forces.

In Figure 9 I have illustrated the direction of the magnetic fields at various relations of the circular to the longitudinal magnetizing forces. The vectors shown in this figure are correct when direct current is used for both horizontal and circular magnetization or when alternating current is used for both with the phase angle equal to zero. The vector 69 is illustrative of the condition resulting when the circular magnetizing force is of some definite value, say, unit value, for example, and the longitudinal magnetizing force is zero. The next vector 70 is indicative of the condition resultant when the circular magnetizing force is twice that of the longitudinal magnetizing force. Vector 71 results when both magnetizing forces are equal. Vector 72 results when the longitudinal magnetizing force is twice the value of the circular magnetizing force, and vector 73 indicates the resultant field when the circular magnetizing force is zero and the longitudinal magnetizing force has unit value.

Of course, if alternating current is used for both longitudinal and circular magnetization, and the phase angle is of a definite value other than zero, there will be a change in the direction of the resultant magnetic field. From the showing in Figure 9 and the above description, it will be apparent that when both magnetizing forces are direct current, or both are alternating current, the direction of the resultant magnetic field across the test piece may be fixed to a fine degree of nicety by adjusting the intensity of one of the magnetizing forces relative to the other. Thus, it is apparent that the resultant magnetic field may be made to cross the test piece at any desired angle within the test piece, in the event it is desired to investigate or suspect a fault not clearly brought out by other resultant fields, or if the shape of the test piece is such to make it desirable to have a resultant field at a certain definite angle.

Although I have shown a particular embodiment of my invention, it will, of course, be understood that I do not wish to be limited thereto, since many modifications may be made, and I therefore contemplate, by the appended claims, to cover all such modifications as fall within the true spirit and scope of my invention.

I claim as my invention:

1. The method of magnetizing a test piece including the steps of applying a direct current magnetizing force tending to magnetize the test piece in one direction, simultaneously applying another direct current magnetizing force tending to magnetize the test piece in another direction, and varying the values of the direct current magnetizing forces.

2. The method of magnetizing a test piece for a particle magnetic inspection test, including the steps of applying one direct current magnetizing force tending to magnetize the test piece in one direction, and simultaneously employing another direct current magnetizing force tending to magnetize the test piece in another direction, said magnetizing forces being fluctuated back and forth between predetermined maxima and minima, one of said direct current magnetizing forces reaching its maximum at a different time from that at which said other magnetizing force reaches its maximum, thereby setting up an oscillating resultant magnetic field in the test piece.

3. The method of magnetizing a test piece for a particle magnetic inspection test, including the steps of applying a fluctuating direct current magnetizing force tending to magnetize the test piece in one direction and simultaneously applying another fluctuating direct current magnetizing force tending to magnetize the test piece in another direction, the fluctuations of said magnetizing forces being out of phase, thereby setting up an oscillating resultant magnetic field in the test piece.

4. The method of magnetizing a test piece for a magnetic particle inspection including the steps of applying a fluctuating direct current magnetizing force tending to longitudinally magnetize a test piece, and simultaneously applying a fluctuating direct current magnetizing force tending to circularly magnetize the test piece, thereby setting up a resultant oscillating field in the test piece.

FOSTER B. DOANE.

REFERENCES CITED

The following references are of record in the file of this patent:

UNITED STATES PATENTS

| Number | Name | Date |
|---|---|---|
| 2,158,409 | De Forest | May 16, 1939 |
| 2,225,179 | Oglevee | Dec. 17, 1940 |
| 2,242,366 | Muller | May 20, 1941 |
| Re. 19,611 | De Forest | June 18, 1935 |
| 2,258,274 | Betz | Oct. 7, 1941 |
| 2,061,692 | Bagley | Nov. 24, 1936 |
| 2,217,733 | De Forest | Oct. 15, 1940 |
| 2,257,736 | Ferrier | Oct. 7, 1941 |
| 2,277,431 | Fitch | Mar. 24, 1942 |
| 2,125,628 | Fredrickson | Aug. 2, 1938 |
| 2,305,659 | Arnold | Dec. 22, 1942 |
| 2,353,550 | De Forest et al. | July 11, 1944 |
| 2,401,467 | Doane | June 4, 1946 |

FOREIGN PATENTS

| Number | Country | Date |
|---|---|---|
| 441,603 | Great Britain | Jan. 22, 1936 |